United States Patent
Kemp et al.

(10) Patent No.: US 6,808,730 B2
(45) Date of Patent: Oct. 26, 2004

(54) HIGHLY ACIDIC METALATED ORGANIC ACID AS A FOOD ADDITIVE

(75) Inventors: Maurice Clarence Kemp, El Dorado Hills, CA (US); Robert Blaine Lalum, Citrus Heights, CA (US); David E. Lewis, Eau Claire, WI (US)

(73) Assignee: Mionix Corporation, Rocklin, CA (US)

( * ) Notice: Subject to any disclaimer, the term of this patent is extended or adjusted under 35 U.S.C. 154(b) by 0 days.

(21) Appl. No.: 10/368,229

(22) Filed: Feb. 18, 2003

(65) Prior Publication Data

US 2003/0161926 A1 Aug. 28, 2003

Related U.S. Application Data

(60) Division of application No. 09/766,546, filed on Jan. 19, 2001, now Pat. No. 6,572,908, which is a continuation-in-part of application No. 09/655,131, filed on Sep. 5, 2000.

(51) Int. Cl.$^7$ ................................................. A23L 3/34
(52) U.S. Cl. ....................... 426/335; 426/332; 426/582; 426/589; 426/638; 426/650
(58) Field of Search .................................. 426/335, 332, 426/582, 589, 638, 650

(56) References Cited

U.S. PATENT DOCUMENTS 6,572,908 B2 * 6/2003 Kemp et al. ................ 426/335

* cited by examiner

*Primary Examiner*—Helen Pratt
(74) *Attorney, Agent, or Firm*—Jackson Walker L.L.P.

(57) ABSTRACT

The use of a highly acidic metalated organic acid composition ("HAMO") as a food additive. The HAMO is used to reduce biological contaminants, and thus preserve, a nutriment. The HAMO is being absorbed in, or adsorbed on, a nutriment material to give a prepared nutriment.

3 Claims, No Drawings

HIGHLY ACIDIC METALATED ORGANIC ACID AS A FOOD ADDITIVE

This is a divisional application of prior U.S. patent application Ser. No. 09/766,546, filed Jan. 19, 2001, now U.S. Pat. No. 6,572,908, which is a continuation-in-part application of prior U.S. patent application Ser. No. 09/655,131, filed Sep. 5, 2000, entitled "Highly Acidic Metalated Organic Acid", and the entire content of each application is hereby incorporated by reference.

BACKGROUND

This invention relates to the use of a highly acidic metalated organic acid as a food additive.

Acids and alcohols have been widely used as ingredients to decontaminate and preserve food and other biological materials. The addition of an organic acid to foodstuffs is called acidulation. Acidulated foods are defined in the Code of Federal Regulations (21 CFR) as any consumable food product with a pH of less than 4.6 and produced to comply with current Good Manufacturing Practices ("cGMP") for food and food additives. These products have cost and taste advantages over heat-treated foods. Acidulated foods give a better taste of "freshness" than those that have been heat treated.

Newer methods of food preservation include the addition of non-pathogenic bacteria to prevent spoilage and irradiation with ionizing radiation causing preservation. Each of these methods has cost, quality and food safety issues associated with implementation. Acidulation of food with mineral and/or organic acids remains the least costly and most effective method of food preservation.

In the late 80's and early 90's, researchers in Japan developed strong ionized water ("SIW") as disinfectants. The SIW was established as water with a pH of 2.7 or less, having an oxidation-reduction potential of 1,000 mv or more, and chlorine concentration of 0.8 ppm or more. The SIW is prepared by electrolysis of water.

Electrolysis of tap water has also been used to produce "strong acid water" and "strong alkali water" both of which were claimed to have antiseptic properties.

U.S. Pat. No. 5,830,838 to Wurzburger, et al. describes a solution for cleaning metal surfaces. The solution is prepared by mixing calcium hydroxide and potassium hydroxide with equivalent sulfuric acid in water then passing the solution through a 10 micron filter. The resulting concentrate can be diluted depending on the degree of surface oxidation of the metal to be treated.

U.S. Pat. No. 5,895,782 to Overton, et al. describes a solution for cleaning metal surfaces particularly non-ferrous alloys such as copper, brass and high strength aluminum alloys. The solution is prepared by mixing $Ca(OH)_2$ and KOH with equivalent sulfuric acid in water then passing the solution through a 10 micron filter. The resulting concentrate can be used full strength or diluted depending on the degree of surface oxidation of the metal to be treated.

International Publication WO 94/09798 describes a pharmaceutical composition for treatment of disease, injury and other disorders. The pharmaceutical composition comprises a complex of a calcium-containing component and a sulfate-containing component in a pharmaceutically acceptable carrier. The reference teaches the isolation from natural materials, such as peat, the inorganic compositions. The inorganic preparations comprise an alkaline, aqueous or organic, or mixture thereof, extract of peat. Peat is extracted with aqueous solutions, organic solutions or water-miscible organic solvents at temperature from below room temperature up to the boiling point of the solvents. The preferred extracting solvents are those having a pH of at least 9. Biologically active constituents of fractionated peat preparations were identified as $CaSO_4.2H_2O$ (gypsum), $CaSO_4.K_2SO_4.H_2O$ (syngenite, also referred to as the double salt of gypsum) and $K_3Na(SO_4)_2$ (apthitalite) by X-ray powder diffraction analysis. The reference also describes the synthesis of syngenite.

It is thus desirable to be able to have a source of "acidity," or $H_3O^+$, without the unwanted disadvantages and be able to reduce environmental and safety hazards associated with acid hydrolysis. Preferably, this source of "acidity" should be able to prevent re-contamination following decontamination, not induce bacterial resistance, not alter the taste, color or smell of treated foodstuffs, not create any odor, effective in water in a wide range of temperatures, relatively free of danger when overdosed, can be neutralized after use, not carcinogenic or mutagenic, non-toxic, almost harmless to the environment, and can be stored for a long period of time without decomposition or turning into hazardous compound.

The control of microbial growth is necessary in many practical situations, and significant advances in agriculture, medicine and food science have been made through study of this area of microbiology. "Control of growth" means to prevent growth of microorganisms. This control is effected in one of two basic ways: (1) By killing microorganisms; or (2) by inhibiting the growth of microorganisms. Control of growth usually involves the use of physical or chemical agents which either kill or prevent the growth of microorganisms. Agents which kill cells are called "cidal" agents; agents which inhibit the growth of cells, but without killing them, are referred to as "static" agents. Thus the term "bactericidal" refers to killing bacteria and "bacteriostatic" refers to inhibiting the growth of bacterial cells. A "bactericide" kills bacteria, a "fungicide" kills fungi. "Sterilization" is the complete destruction or elimination of all viable organisms in or on an object being sterilized. The object is either sterile or not, there are no degrees of sterilization. Sterilization procedures involve the use of heat, radiation or chemicals, or physical removal of microorganisms.

Microorganisms tend to colonize and replicate on different surfaces resulting in adherent heterogenous microbial accumulations termed "biofilms." Biofilms may form on surfaces of food substances, processing equipment and instrumentations. The microorganisms in the biofilms may include bacteria, fungi, viruses, and protozoans. Since food safety is a national priority, any product that can help by solving a multitude of problems associated with food production is desirable. Removal and control of biofilms which harbor dangerous microbial contamination is a sanitation goal that needs to be achieved. It is also desirable to be able to safely decontaminate water and nutriment by lowering pH to levels where contaminants would react and organisms cannot live.

Current sanitizing, disinfectant and pesticide products on the market for these uses contain residues of chlorine, ammonia, organic iodine, metal salts and other deleterious residues. It is desirable to have a way that would preclude these residues by promoting killing and/or acid hydrolysis without the presence of deleterious chemicals. Additionally, this method should generate few hazardous volatile gases. Importantly, it is highly desirable to have a composition that can control the growth of, and kill, microorganisms and, at the same time, destroy the products, generated by, or associated with, the microorganisms.

SUMMARY

The present invention involves the use of a highly acidic metalated organic acid as a food additive. The acidic composition having an acidic pH value and an acid normality value and the composition is prepared by mixing a monovalent or polyvalent cation and an organic acid in the presence of a strong oxyacid, wherein the resultant acidic composition is less corrosive to a ferrous metal than a solution of a mineral acid having the same acidic pH value as that of the acidic composition, and wherein the acid composition is more biocidal than a mixture of the organic acid and a metal salt of the organic acid which mixture has the same acid normality value as that of the acidic composition. The acidic composition can be prepared by mixing at least one regenerating acid, at least one metal base, and at least one organic acid, wherein the amount of the regenerating acid is in excess of the equivalent amount of the metal base. One aspect of the present invention pertains to method of preparing the highly acidic metalated organic acid.

DETAILED DESCRIPTION

One aspect of the present invention pertains to a composition of a highly acidic metalated organic acid ("HAMO"). The composition may have a suspension of very fine particles, and it has a monovalent or a polyvalent cation, an organic acid, and an anion of a regenerating acid, such as the anion of a strong oxyacid. The term "highly acidic" means the pH is in the acidic region, below at least about 4, preferably 2.5. HAMO of the present invention is less corrosive to a ferrous metal than a solution of a mineral acid having the same acidic pH value as that of the acidic composition. HAMO is also more biocidal than a mixture of the organic acid and a metal salt of the organic acid which mixture having the same acid normality value as that of the acidic composition.

Broadly, one way HAMO can be prepared is by mixing the following ingredients: (1) at least one regenerating acid; (2) at least one metal base; and (3) at least one organic acid, wherein the equivalent amount of the regenerating acid is in excess of the equivalent amount of the metal base. The equivalent amount of the metal base should be about equal to that of the organic acid. Instead of using a metal base and an organic acid, a metal salt of the organic acid can be used in place of the metal base and the organic acid. The insoluble solid is removed by any conventional method, such as sedimentation, filtration, or centrifugation.

Generally, HAMO can be prepared by blending or mixing the necessary ingredients in at least the following manners:

1. Regenerating acid+(metal base+organic acid);
2. Regenerating acid+(metal base+salt of organic acid);
3. (Regenerating acid+salt of organic acid)+base; and
4. Regenerating acid+salt of organic acid.

The parenthesis in the above scheme denotes "premixing" the two ingredients recited in the parenthesis. Normally, the regenerating acid is added last to generate the HAMO. Although each of the reagents is listed as a single reagent, optionally, more than one single reagent, such as more than one regenerating acid or organic acid, can be used in the current invention. The number of equivalents of the regenerating acid must be larger than the number of equivalents of the metal base, or those of the metal salt of the organic acid. When the organic acid is an amino acid, which, by definition contains at least one amino group, then the number of equivalents of the regenerating acid must be larger than the total number of equivalents of the metal base, or metal salt of the organic acid, and the "base" amino group of the amino acid. Thus, the resultant highly acidic metalated organic acid is different from, and not, a buffer.

As used herein, a regenerating acid is an acid that will "re-generate" the organic acid from its salt. Examples of a regenerating acid include a strong binary acid, a strong oxyacid, and others. A binary acid is an acid in which protons are directly bound to a central atom, that is (central atom)-H. Examples of a binary acid include HF, HCl, HBr, HI, $H_2S$ and $HN_3$. An oxyacid is an acid in which the acidic protons are bound to oxygen, which in turn is bound to a central atom, that is (central atom) —O—H. Examples of oxyacid include acids having Cl, Br, Cr, As, Ge, Te, P, B, As, I, S, Se, Sn, Te, N, Mo, W, or Mn as the central atom. Some examples include $H_2SO_4$, $HNO_3$, $H_2SeO_4$, $HClO_4$, $H_3PO_4$, and $HMnO_4$. Some of the acids (e.g. $HMnO_4$) cannot actually be isolated as such, but occur only in the form of their dilute solutions, anions, and salts. A "strong oxyacid" is an oxyacid which at a concentration of 1 molar in water gives a concentration of $H_3O^+$ greater than about 0.8 molar.

The regenerating acid can also be an acidic solution of sparingly-soluble Group IIA complexes ("AGIIS"). AGIIS can be prepared by mixing or blending materials given in one of the following scheme with good reproducibility:

(1) $H_2SO_4$ and $Ca(OH)_2$;
(2) $H_2SO_4$, $Ca(OH)_2$, and $CaCO_3$;
(3) $H_2SO_4$, $Ca(OH)_2$, $CaCO_3$, and $CO_2$ (gas);
(4) $H_2SO_4$ and $CaCO_3$;
(5) $H_2SO_4$, $CaCO_3$, and $Ca(OH)_2$;
(6) $H_2SO_4$, $CaCO_3$, and $CO_2$ (gas);
(7) $H_2SO_4$ and $CaSO_4$;
(8) $H_2SO_4$, $Ca(OH)_2$, and $CaSO_4$;
(9) $H_2SO_4$, $CaSO_4$, and $CaCO_3$;
(10) $H_2SO_4$, $CaSO_4$, $CaCO_3$, and $Ca(OH)_2$;
(11) $H_2SO_4$, $CaSO_4$, $CaCO_3$, and $CO_2$ (gas); and
(12) $H_2SO_4$, $CaSO_4$, $CaCO_3$, $CO_2$ (gas), and $Ca(OH)_2$.

Thus, preferably, AGIIS is prepared by mixing calcium hydroxide with concentrated sulfuric acid, with or without an optional Group IIA salt of a dibasic acid (such as calcium sulfate) added to the sulfuric acid. The optional calcium sulfate can be added to the concentrated sulfuric acid prior to the introduction of calcium hydroxide into the blending mixture. The addition of calcium sulfate to the concentrated sulfuric acid appears to reduce the amount of calcium hydroxide needed for the preparation of AGIIS. Other optional reagents include calcium carbonate and gaseous carbon dioxide being bubbled into the mixture. Regardless of the use of any optional reagents, it was found that the use of calcium hydroxide is desirable.

One preferred method of preparing AGIIS can be described briefly as: Concentrated sulfuric acid is added to chilled water (8°–12° C.) in the mixing vessel, then, with stirring, calcium sulfate is added to the acid in chilled water to give a mixture. Temperature control is paramount to this process. To this stirred mixture is then added a slurry of calcium hydroxide in water. The solid formed from the mixture is then removed. This method involves the use of sulfuric acid, calcium sulfate, and calcium hydroxide, and it has several unexpected advantages. Firstly, this mixing is not violent and is not exceedingly exothermic. Besides being easy to control and easy to reproduce, this mixing uses ingredients each of which has been reviewed by the U.S. Food and Drug Administration ("U.S. FDA") and determined to be "generally recognized as safe" ("GRAS"). As such, each of these ingredients can be added directly to food, subject, of course, to certain limitations. Under proper concentration, each of these ingredients can be used as processing aids, acidulants and in food contact applications. Their use is limited only by product suitability and current Good Manufacturing Practices ("GMP").

The sulfuric acid used in the preparation of AGIIS or for this invention is usually 95–98% FCC Grade (about 35–37 N). Concentration of sulfuric acid used to generate AGIIS can range from about 0.05 M to about 18 M (about 0.1 N to about 36 N), preferably from about 1 M to about 5 M. It is application specific. The term "M" used denotes molar or moles per liter.

In the preparation of AGIIS, normally, a slurry of finely ground calcium hydroxide suspended in water (about 50% of W/V) is the preferred way of introducing the calcium hydroxide, in increments, into a stirred solution of sulfuric acid, with or without the presence of calcium sulfate. Ordinarily, the mixing is carried out below 40° C., preferably below room temperature, and more preferably below 10° C. The time to add calcium hydroxide can range from about 1 hour to about 4 hours. The agitation speed can vary from about 600 to about 700 rpm, or higher. After mixing, the mixture is filtered through a 5 micron filter. The filtrate is then allowed to sit overnight and the fine sediment is removed by decantation.

The calcium hydroxide used for AGIIS or for this invention is usually FCC Grade of about 98% purity. For every mole of concentrated acid, such as sulfuric acid, the amount, in moles, of calcium hydroxide used is application specific and ranges from about 0.1 to about 1.

The calcium carbonate is normally FCC Grade having a purity of about 98%. When used with calcium hydroxide as described above for the preparation of AGIIS, for every mole of a concentrated acid, such as sulfuric acid, the amount, in moles, of calcium carbonate ranges from about 0.001 to about 0.2, depending on the amount of calcium hydroxide used.

The optional carbon dioxide in the preparation of AGIIS is usually bubbled into the slurry containing calcium hydroxide at a speed of from about 1 to about 3 pounds pressure. The carbon dioxide is bubbled into the slurry for a period of from about 1 to about 3 hours. The slurry is then added to the mixing vessel containing the concentrated sulfuric acid.

Another optional ingredient in the preparation of AGIIS is calcium sulfate, a Group IIA salt of a dibasic acid. Normally, dihydrated calcium sulfate is used. As used in this application, the phrase "calcium sulfate," or the formula "CaSO$_4$," means either anhydrous or hydrated calcium sulfate. The purity of calcium sulfate (dihydrate) used is usually 95–98% FCC Grade. The amount of calcium sulfate, in moles per liter of concentrated sulfuric acid ranges from about 0.005 to about 0.15, preferably from about 0.007 to about 0.07, and more preferably from about 0.007 to about 0.04. It is application specific.

An organic acid is an acidic compound containing carbon. It includes carboxylic acid, amino acid, acidic vitamin, sulfonic acid, phosphonic acid, and others. A carboxylic acid is an organic compound containing an —COOH group, i.e., a carbonyl attached to a hydroxyl group. A carboxylic acid can be a mono-carboxylic acid, a di-carboxylic acid, or a tri-carboxylic acid. A mono-carboxylic acid can be represented by a general formula of $R^1$—COOH, wherein $R^1$ can be: H; $C_1$–$C_4$ saturated alkyl; $C_2$–$C_5$ unsaturated alkyl with 2 or less double bonds; or $C_2$–$C_5$ unsaturated alkyl with 2 or less triple bonds; $CH_3CH(OH)$; $HOCH_2(CHOH)_4$; or $R_2CH(NH_2)$, wherein $R_2$ is H, $C_1$–$C_4$ saturated alkyl, $C_6H_5CH_2$, p-HO—$C_6H_4CH_2$, $H_2N(CH_2)_4$, $HOCH_2$, or $CH_3CHOH$. A di-carboxylic acid can be represented by a general formula of HOOC—$R^3$—COOH, wherein $R^3$ can be: $(CH_2)_m$, in which m can be 1–3; (CH=CH); $CH_2CH(OH)$; $H(OH)C$—CH(OH); or $(CH_2)_pCH(NH_2)$, in which p is 2 or 3. A tri-carboxylic acid can be represented by a general formula of $HOOCR^4(COOH)COOH$, wherein $R^4$ can be: $CH_2C(OH)CH_2$; or $CH_2CHCH_2$. Although some amino acids have been included in the general category of mono-carboxylic acid, it is known in the art that amino acids include: alanine; arginine; aspartic acid (asparagine); cysteine (cystine); glutamic acid (glutamine); glycine; histidine; hydroxylysine; hydroxyproline; isoleucine; leucine; lycine; mehtionine; phenylalanine; proline; serine; threonine; tryptophan; tyrosine; valine; aminoadipic acid; diaminobutyric; ornithine; pipecolic acid; sarcosine; and thiiodothyronine (thyroxine).

The metal base can be in the form of an $OH^-$, $CO_3^=$, $HCO_3^-$, or $O^=$ salt. The metal can be a monovalent metal, a polyvalent metal, all transition and rare earth elements, Sn, Pb, or Bi. Examples of monovalent metals include elements in Group IA. The polyvalent metals can be a divalent metal or a trivalent metal. Examples of divalent metals include elements in Group IIA, except Be; and examples of trivalent metals include elements in Group IIIA, except B. Preferably the metal is Mn, Mg, Ca, Fe(II), Cu(II), Zn(II), Ce, Ni, Pd, Cr, Ti, Zr, Co, Al, Sn, Pb, Bi, V(III), Cd, Hg, Pt, Hf, and other first-row lanthamides, except Pm. More preferably, the metal is Mg, Ca, Fe(II), Cu(II), Zn, Cr, or Co.

Salts of an organic acid as used in this application include the salts of the metals, discussed above, salts of the organic acids, also discussed above, and others.

The term "biocidal" means destruction of a biological contaminant. A "biological contaminant" is defined as a biological organism, or the product of biological organism, such as toxin, or both, all of which contaminate the environment and useful products. This biological contaminant results in making the environment or product hazardous.

Biological contaminants, such as bacteria, fungi, mold, mildew, spores, and viruses have potentially reactive substances in their cell wall/membranes; however, they hide in cells (viruses and some bacteria) and/or secrete biofilms (most bacteria, fungi, mold and mildew) to protect them from the environment.

Bacteria form or elaborate intracellular or extracellular toxins. Toxin is a noxious or poisonous substances that: (1) are an integral part of the bacteria; (2) are an extracellular product (exotoxin) of the bacteria; or (3) represent a combination or the two situations, formed or elaborated during the metabolism and growth of bacteria. Toxins are, in general, relatively complex antigenic molecules and the chemical compositions are usually not known. The harmful effects of bacteria come not only from the bacteria themselves, but also from the toxins produced by bacteria. Toxins produced by bacteria are just as, if not more, hazardous to the product than the bacteria themselves. Ordinary disinfectants, such as quaternary ammonium compounds, will kill bacteria but may have no effect on bacterial toxins and endotoxins. In fact, many disinfectants actually contribute to the endotoxins problems by causing their release from the killed bacteria. The bacterial toxins and endotoxins can cause serious adverse effects in human and animals. Endotoxins are a major cause of contamination in food products, in the production of pharmaceuticals, medical devices, and other medical products.

The outer covering, i.e. epidermis, of animals and cuticle of plants resist the growth and/or entry of the above micro-organisms into the interior of the complex organism. One of the microbial growth prevention methods used by plants and animals is the maintenance of a surface pH or secretion of a coating that is not conducive to the attachment and propagation of micro-organisms. After a plant product is harvested or an animal product processed, these products loose the ability to resist the infestation of micro-organisms.

The composition of the present invention was found to be a "preservative." The composition is minimally corrosive; however, it can create an environment where destructive micro-organisms cannot live and propagate, thus prolonging the shelf-life of the product. As is known in the art, formic acid is not as corrosive to a ferrous metal as is a mineral acid, such as hydrochloric acid. Yet, formic acid solution is more corrosive to a galvanized roofing nail than is a solution of HAMO. In one experiment, after 48 hours of air-drying, a galvanized roofing nail, which had been dipped for 20 minutes at room temperature in a solution of formic acid with a pH of 1.5, showed obvious, visible corrosion. Yet, under similar conditions, no such obvious, visible corrosion was observed for a galvanized roofing nail having been dipped in a solution of HAMO (prepared from lactic acid, calcium hydroxide and regenerated with phosphoric acid) at a pH of 1.44.

The utility of the method of preservation demonstrated herein is that additional chemicals do not have to be added to the food or other substance to be preserved because the inherent low pH of the mixture is preservative. Since preservative chemicals do not have to be added to the food substance, taste is improved and residues are avoided. Organoleptic testing of a number of freshly preserved and previously preserved food stuffs have revealed the addition of composition improves taste and eliminates preservative flavors. The term "organoleptic" means making an impression based upon senses of an organ or the whole organism.

The composition of the present invention was found to be biocidal. The composition was found to be biocidal to *E. coli*, and other bacteria.

As used herein, the term "nutriment" means something that nourishes, heals, or promotes growth and repair the natural wastage of organic life. Thus, food for a human or an animal are all examples of nutriment. Sometimes, food for an animal is termed "feed." Other examples of nutriment include beverages, food additive, beverage additive, food supplement, beverage supplement, seasoning, spices, flavoring agent, stuffing, sauce, food dressing, diary products, pharmaceutical, biological product, and others. The nutriment can be of plant origin, animal origin, or synthetic.

The following examples are provided to further illustrate this invention and the manner in which it may be carried out. It will be understood, however, that the specific details given in the examples have been chosen for purposes of illustration only and not be construed as limiting the invention. Unless otherwise defined, the amount of each ingredient or component of the present invention is based on the weight percent of the final composition.

EXAMPLE 1

Preparation of 1.2–1.5 N AGIIS ($H_2SO_4/Ca(OH)_2$)

An amount of 1055 ml (19.2 moles, after purity adjustment and taking into account the amount of acid neutralized by base) of concentrated sulfuric acid (FCC Grade, 95–98% purity) was slowly added with stirring, to 16.868 L of RO/DI water in each of mixing flasks a, b, c, e, and f. The amount of water had been adjusted to allow for the volume of acid and the calcium hydroxide slurry. The mixture in each flask was mixed thoroughly. Each of the mixing flasks was chilled in an ice bath and the temperature of the mixture in the reaction flask was about 8–12° C. The mixture was continuously stirred at a rate of about 700 rpm.

Separately, a slurry was made by adding RO/DI water to 4 kg of calcium hydroxide (FCC Grace, 98% purity) making a final volume of 8 L. The mole ratio of calcium hydroxide to concentrated sulfuric acid was from about 0.45 to about 1. The slurry was a 50% (W/V) mixture of calcium hydroxide in water. The slurry was mixed well with a high-shear-force mixer until the slurry appeared uniform. The slurry was then chilled to about 8–12° C. in an ice bath and continuous stirred at about 700 rpm.

To each of the mixing flasks was added 150 ml of the calcium hydroxide slurry every 20 minutes until 1.276 L (i.e. 638 g dry weight, 8.61 moles, of calcium hydroxide) of the slurry had been added to each reaction vessel. The addition was again accompanied by thorough mixing at about 700 rpm.

After the completion of the addition of the calcium hydroxide to the mixture in each mixing vessel, the mixture was filtered through a 5-micron filter.

The filtrate was allowed to sit for 12 hours, the clear solution was decanted to discard any precipitate formed. The resulting product was AGIIS having an acid normality of 1.2–1.5. Analysis showed: Ca, 715 ppm (600 ppm–800 ppm); $SO_4$, 45,700 ppm (40,000 ppm–55,000 ppm).

EXAMPLE 2

Preparation of 2 N AGIIS ($H_2SO_4/Ca(OH)_2/CaSO_4$)

For the preparation of 1 L of 2 N AGIIS, an amount of 79.54 ml (1.44 moles, after purity adjustment and taking into account the amount of acid to be neutralized by base) of concentrated sulfuric acid (FCC Grade, 95–98% purity) was slowly added, with stirring, to 853.93 ml of RO/DI water in a 2 L mixing flask. Five grams of calcium sulfate (FCC Grade, 95% purity) were then added slowly and with stirring to the mixing flask. The mixture was mixed thoroughly. At this point, the mixture would usually exhibit an acid normality of 2.88. The mixing flask was chilled in an ice bath and the temperature of the mixture in the reaction flask was about 8–12° C. The mixture was continuously stirred at a rate of about 700 rpm.

Separately, a slurry was made by adding 49.89 ml of RO/DI water to 33.26 g (0.44 mole, after purity adjustment) of calcium hydroxide (FCC Grace, 98% purity) making a final volume of 66.53 ml. The mole ratio of calcium hydroxide to concentrated sulfuric acid was from about 0.44 to about 1. The slurry was mixed well with a high-shear-force mixer until the slurry appeared uniform. The slurry was then chilled to about 8–12° C. in an ice bath and continuous stirred at about 700 rpm.

The slurry was then slowly added over a period of 2–3 hours to the mixture, still chilled in an ice bath and being stirred at about 700 rpm.

After the completion of the addition of slurry to the mixture, the product was filtered through a 5-micron filter. It was normal to observe a 20% loss in volume of the mixture due to the retention of the solution by the salt and removal of the salt.

The filtrate was allow to sit for 12 hours, the clear solution was decanted to discard any precipitate formed. The resulting product was AGIIS having an acid normality of 2.

EXAMPLE 3

Preparation of 12 N AGIIS ($H_2SO_4Ca(OH)_2/CaSO_4$)

For the preparation of 1 L of 12 N AGIIS, an amount of 434.17 ml (7.86 moles, after purity adjustment and taking into account amount of acid neutralized by base) of concentrated sulfuric acid (FCC Grade, 95–98% purity) was slowly added, with stirring, to 284.60 ml of RO/DI water in a 2 L mixing flask. Three grams of calcium sulfate (FCC Grade, 95% purity) were then added slowly and with stirring to the mixing flask. The mixture was mixed thoroughly. The mixing flask was chilled in an ice bath and the temperature of the mixture in the mixing flask was about 8–12° C. The ingredients were continuously stirred at a rate of about 700 rpm.

Separately, a slurry was made by adding 210.92 ml of RO/DI water to 140.61 g (1.86 moles, after purity adjustment) of calcium hydroxide (FCC Grade, 98% purity) making a final volume of 281.23 ml. The mole ratio of calcium hydroxide to concentrated sulfuric acid was about 0.31. The slurry was mixed well with a high-shear-force mixer until the slurry appeared uniform. The slurry was then chilled to about 8–12° C. in an ice bath and continuous stirred at about 700 rpm.

The slurry was then slowly added over a period of 2–3 hours to the mixture, still chilled in an ice bath and being stirred at about 700 rpm.

After the completion of the addition of slurry to the mixture, the product was filtered through a 5-micron filter. It was normal to observe a 20% loss in volume of the mixture due to the retention of the solution by the salt and removal of the salt.

The filtrate was allow to sit for 12 hours, the clear solution was decanted to discard any precipitate formed. The resulting product was AGIIS having an acid normality of 12.

EXAMPLE 4

General Method for the Preparation of HAMO

For a 1 L final volume of HAMO, n moles of organic acid (n is from about 0.01 to about 15) is suspended or dissolved in 1–2 times the volume of DI water. To this mixture is then added monovalent, divalent or trivalent metal base (hydroxide, oxide, carbonate or bicarbonate, or combination thereof) as the dry solid or as a slurry in DI water in the ratio of 1.0 equivalent weights of base per equivalent weight of acid. The addition is accomplished as quickly as possible. To the resultant mixture is added a quantity of regenerating acid sufficient to ensure complete regeneration of the organic acid from its metal salt, but a quantity not greater than 18 moles/L. Preferably, the addition of the regenerating acid is accomplished as quickly as possible without permitting the mixture temperature to rise above 80° C. After the mixing is complete, usually from about 0.5 hour to about 1 hour the undissolved solids are removed by filtration through a 5-micron filter or by centrifugation.

EXAMPLE 5

Formation of a HAMO from Maleic Acid, Calcium Hydroxide, and Sulfuric Acid

To a mixture of maleic acid (1 kg, 8.61 moles) and RO-DI water (1 L), solid calcium hydroxide (335 g, 4.52 moles) was added in 50-g portions with stirring. After the addition of the calcium hydroxide was complete, RO-DI water (500 mL) was added. To the resulting mixture, concentrated sulfuric acid (238 mL) was added in 25-mL aliquots at a rate that maintained the reaction temperature below 85° C. The resultant mixture was centrifuged at 15000 rpm for 25 minutes to provide the HAMO as supernatant, pH of 0.5–1.0. Analysis showed: Ca, 12,900 ppm; $SO_4$ 159,000 ppm, maleic acid, 472,236.47 ppm.

EXAMPLE 6

Formation of a HAMO from Gluconic Acid, Calcium Hydroxide, and Sulfuric Acid

To a stirred mixture of gluconic acid (50%, 1 kg, 2.55 moles) and water (200 mL) was added 97 g (1.3 moles) of solid calcium hydroxide. After the mixing was complete, concentrated sulfuric acid (76 mL) was added as rapidly as possible while keeping the reaction temperature below 85° C. The final mixture was centrifuged at 15,000 rpm for 25 minutes to give the HAMO as supernatant, pH of 1.0. Analysis showed: Ca, 1,210 ppm; $SO_4$, 11,600 ppm; gluconic acid, 571,106.6 pppm.

EXAMPLE 7

Formation of a HAMO from Succinic Acid, Calcium Hydroxide, and Phosphoric Acid

Solid calcium hydroxide (320 g, 4.23 moles) was added in 50-g portions to a stirred mixture of succinic acid (1 kg, 8.47 moles) and RO-DI water (1200 mL). Concentrated phosphoric acid (529 mL, 4.75 moles) was added in 50-mL aliquots as rapidly as possible while maintaining the temperature below 85° C. The final product had a pH of 1.5. Analysis showed: Ca, 26,700 ppm; $PO_4$, 250,000 ppm; succinic acid, 56,695.95 ppm.

EXAMPLE 8

Formation of a HAMO from Acetic Acid, Calcium Carbonate, and Sulfuric Acid

1. Preparation of Calcium Acetate. One liter (17.48 moles) of acetic acid was added to an eight-liter container, and one liter of water was added. Calcium carbonate powder (874 g, 8.74 mole, 99+%) was added in 100-g portions over 2.5 hours with agitation until the solution was neutral to pH paper. Water was added as needed to maintain fluidity in the mixture during the neutralization.

2. Formation of the HAMO. Water was added to the calcium acetate formed in step 1 to bring the total volume to 3 gallons. To this solution, 17.48 moles of 95–98% sulfuric acid was added. The mixture was mixed well, and the mixing allowed to proceed without cooling. After the mixing was complete, the mixture was filtered through a 5 micron filter to give the HAMO, pH was about 0. Analysis showed: Ca, 17,000 ppm; $SO_4$, 158,000 ppm.

In smaller scale preparations, it was more convenient to free the HAMO from undissolved solids by centrifugation.

EXAMPLE 9

Formation of a HAMO from Lactic Acid, Calcium Carbonate, and Sulfuric Acid

1. Preparation of Calcium Lactate. One liter (11.25 mole) of 85% lactic acid was added to a five-liter container, and one liter of water was added. Calcium carbonate powder (874 g, 8.74 mole, 99+%) was added in 100-g portions over 2.5 hours with agitation until the solution was neutral to pH paper. Water was added as needed to maintain fluidity in the mixture during the neutralization.

2. Formation of the HAMO. Water was added to the calcium lactate formed in step 1 to bring the total volume to 5 gallons. To this solution, 11.25 moles of 95–98% sulfuric acid was added. The mixture was mixed well, and the mixing was allowed to proceed without cooling. After the mixing was complete, the mixture was filtered through a 5 micron filter to give the HAMO, pH of less than 1.0.

In smaller scale preparations, it was more convenient to free the HAMO from undissolved solids by centrifugation.

EXAMPLE 10
Formation of a HAMO from Gluconic Acid, Ferrous Hydroxide, and Phosphoric Acid Ferrous hydroxide was prepared by the reaction between 646 grams of ferrous sulfate and 224 grams of sodium hydroxide in RO-DI water to give a final volume of 2730 mL. The suspension of ferrous hydroxide obtained in this way was allowed to settle, the supernatant was removed by decantation, and the solid was washed three times with water by suspending in a total volume of 2730 mL, allowing the solid to settle, and decanting the supernatant.

The ferrous hydroxide was suspended in RO-DI water to give a total volume of 500 mL, and this mixture was added to a mixture of gluconic acid (50%, 1 kg, 2.55 moles) and RO-DI water (100 mL). Concentrated phosphoric acid (100 mL) and sucrose (35 g) were added sequentially to this mixture. The final material did not require filtration or centrifugation, pH of 1.0. Analysis showed: Fe, 12,800 ppm; Na, 7,450 ppm; $PO_4$, 90,600 ppm; $SO_4$, 15,800 ppm, gluconic acid, 155,346.8 ppm.

EXAMPLE 11
Formation of a HAMO from Butyric Acid, Magnesium Hydroxide, and Phosphoric Acid To a mixture of butyric acid (500 mL, 5.4 moles) and RO-DI water (500 mL) was added solid magnesium hydroxide (163.6 g, 2.73 moles) in 25-g portions. To the resulting mixture was added concentrated phosphoric acid (180 mL) in 50-mL aliquots. The final solution had a pH of 1.0. Analysis showed: Mg, 390 ppm; $PO_4$, 1,560 ppm; butyric acid, 661, 705.93 ppm.

EXAMPLE 12
Formation of a HAMO from Maleic Acid, Magnesium Hydroxide, and Phosphoric Acid Solid magnesium hydroxide (300 g, 97.5%, 5.02 moles) was added in 50-g portions to stirred solution of maleic acid (1 kg, 8.53 moles) in RO-DI water (1,500 mL). At the end of the adddition, the pH of the mixture was 5.0. Concentrated phosphoric acid (338 mL, 85–90%) was added in 25-mL aliquots. No precipitate was observed during the acidfication step. The final pH of the HAMO solution was 1.0. Analysis showed: Mg, 19,500 ppm; $PO_4$, 287,000 ppm; maleic acid, 95,816.74 ppm.

EXAMPLE 13
Formation of a HAMO from Succinic Acid, Magnesium Hydroxide, and AGIIS Solid magnesium hydroxide (101 g, 1.16 moles) was added in two equal portions to a stirred suspension of succinic acid (400 g, 3.39 moles) in RO-DI water (1 L). After the reaction was complete, AGIIS (607 mL, 5.58 N) was added in 50-mL aliquots at a rate that maintained the reaction temperature below 85° C. The solution was centrifuged at 15,000 rpm for about 25 minutes. The pH of the HAMO was 1.0–1.5. Analysis showed: Mg, 24,100 ppm; $SO_4$, 115,000 ppm; succinic acid, 21,401.88 ppm.

EXAMPLE 14
Formation of a HAMO from Calcium Hydroxide, a Mixture of Acetic, Lactic and Propionic Acids, and Sulfuric Acid Lactic acid (6 moles), propionic acid (6 moles), and acetic acid (6 moles) were added to a 5-gallon container and RO-DI water (lL) was added. Solid calcium hydroxide (678 g, 9 moles) was added slowly to this mixture with stirring. To this mixture was added 9 M sulfuric acid (1L, 9 moles $H_2SO_4$), and water (3L) as necessary to keep the mixture mobile. The resultant mixture was filtered through a 5-micron filter. The pH of the HAMO was 0.6. Analysis showed: Ca, 205 ppm; $SO_4$, 23,900 ppm, acetic acid, 76,565.3 ppm; lactic acid, 85462.62 ppm; propionic acid, 59,328.81 ppm.

EXAMPLE 15
Formation of a HAMO from Calcium Hydroxide, a Mixture of Formic, Lactic and Propionic Acids, and AGIIS Lactic acid (6 moles), propionic acid (6 moles), and formic acid (6 moles) were added to a 5-gallon container and a saturated solution of calcium sulfate (1L) was added. Solid calcium hydroxide (680 g, 9 moles) was added to this mixture in 100-g portions with stirring. During the addition, the reaction temperature rose to 85° C. To this mixture was added 9 M sulfuric acid (950 mL, 8.55 moles $H_2SO_4$), AGIIS (1.2 N, 250 mL, 0.15 moles acid), and water (1L). The resultant mixture was filtered through a 5-micron filter. The final HAMO had a pH of 1.0. Analysis showed: Ca, 215 ppm; $SO_4$, 17,000 ppm; formic acid, 47,463.23 ppm; lactic acid, 85,077.87 ppm; propionic acid, 62,121.03 ppm.

EXAMPLE 16
Formation of a HAMO from Calcium Propionate and Sulfuric Acid

RO-DI water (2 L) was placed in an 8-L container and calcium propionate (5.36 moles) was added. The mixture was stirred, and an additional 2.5 L of RO-DI water was added to complete dissolution of the salt. Concentrated sulfuric acid (300 mL, 5.62 moles) was added, and the mixture stirred until the reaction was complete. The resultant mixture was filtered through a 5-micron filter. The pH of the HAMO was 1.5. Analysis showed Ca, 987 ppm; $SO_4$, 2,580 ppm; propionate 107,010.59 ppm.

EXAMPLE 17
Formation of a HAMO from Calcium Lactate and AGIIS

To a mixture of 5.60 N AGIIS (1 L) and RO-DI water (1 L) was added solid calcium lactate pentahydrate (2.79 moles). The resultant mixture was allowed to stir without cooling until the mixing was complete. The final mixture was filtered through a 5-micron filter. The pH of the HAMO was 2.5–3.0. Analysis showed: Ca, 2,550 ppm; $SO_4$, 1,090 ppm; lactate, 162,656.39 ppm.

EXAMPLE 18

Physical Properties of Selected HAMO's

| Description | pH | Ca ppm × $10^3$ | $SO_4$ ppm × $10^3$ | Mg ppm × $10^3$ | $PO_4$ ppm × $10^3$ | Other |
|---|---|---|---|---|---|---|
| Lactic acid HAMO neutralized with $CaCO_3$ and regenerated with sulfuric acid | 1.0 | | | | | Slight yellow tint, Sour/citrus taste |
| Acetic acid HAMO neutralized with $CaCO_3$ and regenerated with sulfuric | <0.0 | | | | | |

-continued

Physical Properties of Selected HAMO's

| Description | pH | Ca ppm × $10^3$ | $SO_4$ ppm × $10^3$ | Mg ppm × $10^3$ | $PO_4$ ppm × $10^3$ | Other |
|---|---|---|---|---|---|---|
| Lactic acid HAMO from Ca Lactate and regenerated with 5.6 N AGIIS | 2.5–3.0 | | | | | Slight yellow tint |
| Lactic acid HAMO from $CaCO_3$ Lactate and regenerated with 5.6 N AGIIS | <0.0 | 2.55 | 1.09 | | | Slight yellow tint |
| Propionic acid HAMO neutralized with $Ca(OH)_2$ and regenerated with sulfuric acid | 1.5 | 0.917 | 2.55 | | | |
| Formic Acid HAMO neutralized with $Ca(OH)_2$ and regenerated with sulfuric acid | 1.0–1.5 | 0.163 | 3.07 | | | |
| Lactic acid HAMO neutralized with $Ca(OH)_2$ and regenerated with phosphoric acid | | 44.6 | | | 329 | Pickles iron and prohibits rust |
| Formic acid HAMO neutralized with $Ca(OH)_2$ and regenerated with phosphoric acid | 1.0–1.5 | 22.6 | | | 156 | |
| Propionic acid, formic acid, lactic acid HAMO neutralized with $Ca(OH)_2$ and regenerated with sulfuric acid | 1.0 | 0.215 | 17 | | | |
| Propionic acid, lactic acid HAMO neutralized with $Ca(OH)_2$ and regenerated with sulfuric acid | 0.6 | 0.205 | 23.9 | | | |
| Gluconic acid HAMO neutralized with $Ca(OH)_2$ and regenerated with sulfuric acid | 1.0 | 1.21 | 11.6 | | | Sugar odor |
| Gluconic acid HAMO neutralized with $Fe(OH)_2$ and regenerated with phosphoric acid | 1.0 | 1.28 (Fe) | 15.8 | | 90.6 | The solution had a faint metallic odor and taste |
| Acetic acid HAMO neutralized with $CaCO_3$ and regenerated with sulfuric acid | <0.0 | | | | | |
| Acetic acid HAMO from Ca acetate and regenerated with phosphoric acid | 2.0–2.5 | 17 | | | 158 | |
| Maleic acid HAMO neutralized with $Ca(OH)_2$ and regenerated with sulfuric acid | 0.5–1.0 | 12.9 | 15.9 | | | |
| Maleic acid HAMO neutralized with $Ca(OH)_2$ and regenerated with phosphoric acid | 1.0–1.5 | | | | | |
| Maleic acid HAMO neutralized with $Mg(OH)_2$ and regenerated with sulfuric acid | 0.5 | | 163 | 34.9 | | |
| Maleic acid HAMO neutralized with $Mg(OH)_2$ and regenerated with phosphoric acid | 1.0 | | | 19.5 | 287 | |

-continued

Physical Properties of Selected HAMO's

| Description | pH | Ca ppm × $10^3$ | $SO_4$ ppm × $10^3$ | Mg ppm × $10^3$ | $PO_4$ ppm × $10^3$ | Other |
|---|---|---|---|---|---|---|
| Lactic acid, propionic acid, acetic acid HAMO neutralized with $Ca(OH)_2$ and regenerated with 10 N AGIIS | <<0.0 | | | | | |
| Butyric acid HAMO neutralized with $Ca(OH)_2$ and regenerated with phosphoric acid | | 0.589 | | | 7.16 | |
| Butyric acid HAMO neutralized with $Ca(OH)_2$ and regenerated with phosphoric acid | | | | 0.39 | 1.56 | |
| Succinic acid HAMO neutralized with $Ca(OH)_2$ and regenerated with phosphoric acid | 1.5 | 26.7 | | | 250 | |
| Succinic acid HAMO neutralized with $Ca(OH)_2$ and regenerated with sulfuric acid | 0.5–1.0 | 0.500 | 31 | | | |
| Succinic acid HAMO neutralized with $Ca(OH)_2$ and regenerated with 5.58 N AGIIS | 1.0–1.5 | 0.443 | 23.5 | | | |
| Succinic acid HAMO neutralized with $Mg(OH)_2$ and regenerated with 5.58 N AGIIS | 1.0–1.5 | | | 115 | 24.1 | |

EXAMPLE 19

Formation of a HMO from Glycine, Calcium Hydroxide and Sulfuric Acid

Glycine (37.55 g, 0.5 moles) was suspended in DI water (100 mL) and solid calcium hydroxide (18.55 g, 0.25 moles) was added to the vigorously stirred suspension. The mixture was allowed to stir at room temperature for 30 minutes, and was then diluted to a volume of 350 mL with DI water. Concentrated sulfuric acid (27 mL, 55.6 g, 0.56 moles) was added as rapidly as possible without causing the mixture to rise above 85° C. The final mixture was allowed to stir for 30 minutes, and was then diluted to a final volume of 500 mL with DI water, and stirred a further 1 hour. The mixture was filtered through a medium-porosity glass sinter to give the HAMO.

EXAMPLE 20

Formation of a HAMO from Glutamic Acid, Calcium Hydroxide and Sulfuric Acid

Glutamic Acid (58.88 g, 0.4 moles) was suspended in DI water (100 mL) and solid calcium hydroxide (27.6 g, 0.4, moles) was added to the vigorously stirred suspension. The reaction mixture became noticeably warm. The mixture was allowed to stir at room temperature for 45 minutes, and was then diluted to a volume of approximately 350 mL with DI water. Concentrated sulfuric acid (28 mL, 57.5 g, 0.57 moles) was added as rapidly as possible without causing the mixture to rise above 85° C. The final mixture was allowed to stir for 30 minutes, and was then diluted to a final volume of 500 mL with DI water, and stirred a further 1 hour. The mixture was filtered through a medium-porosity glass sinter to give the HAMO. Analysis showed: Ca, 646 ppm; $SO_4$, 5,120 ppm.

EXAMPLE 21

Formation of a HAMO from Glutamic Acid, Basic Copper (II) Carbonate and Phosphoric Acid Glutamic Acid (58.88 g, 0.4 moles) was suspended in DI water (100 mL) and solid basic copper carbonate (55.2 g, 0.25 moles of $CuCO_3.Cu(OH)_2$) was added to the vigorously stirred suspension. The mixture became extremely viscous and slow effervescence was observed. The mixture was stirred at ambient temperature for 24 hours to complete the reaction. Concentrated phosphoric acid (53.6 g, 86.5%, 0.47 moles) was added to the vigorously stirred mixture in a single aliquot, and the mixture was stirred for 24 hours. Constant stirring was required to prevent the mixture from setting solid. Filtration of the mixture through a medium porosity sintered glass funnel provided the HAMO as a deep blue solution.

EXAMPLE 22

Formation of a HAMO from Glutamic Acid, Basic Cobalt (II) Carbonate and Phosphoric Acid Glutamic Acid (58.3 g, 0.4 moles) was suspended in DI water (200 mL) and solid basic cobalt carbonate (81.35 g, 0.16 moles of $2CoCO_3.3Co(OH)_2$) was added to the vigorously stirred suspension. The mixture became viscous and slow effervescence was observed. The mixture was stirred at ambient temperature for 24 hours to complete the reaction. Concentrated phosphoric acid (53.6 g, 86.5%, 0.47 moles) was added to the vigorously stirred mixture in a single aliquot, and the mixture was stirred for 24 hours. Constant stirring was required to prevent the mixture from setting solid. Filtration of the mixture through a medium porosity sintered glass funnel provided the HAMO as a pink solution.

EXAMPLE 23

Formation of HAMO from Glycolic Acid and Salicylic Acid 500 grams of salicylic acid and 1 kg of glycolic acid were added to a container. 1.5 L water was mixed into the container. 400 g $CaCO_3$ was slowly mixed into the slurry which solidified rapidly. The dry salts were allowed to equilibrate for about 20 minutes. 4 L of oleiec acid was slowly mixed in a 1 L intervals. 1.25 L of phosphoric acid (80–85%) was then added. The solution was allowed to equilibrate for about one hour. Two phases were noted, a water and "lipid" phase. The two phases were separated and bottled separately. The pH of the water phase was less than 0.0.

EXAMPLE 24
Formation of HAMO from Glycolic Acid

1 L of water was added to a container. 500 grams (6.51 moles) of glycolic acid was dissolved into the water. The solution was stirred on a magnetic plate at approximately 600–700 rpm. 246.04 grams of calcium hydroxide was slowly added in 50-gram intervals. After the formation of the calcium glycolate salt, 1.4 L of 4.8 N AGIIS was slowly mixed into the salts at 50-ml intervals. 2L of solution was recovered after decantation. The solution had a yellow tint an a pH of ~1.0

EXAMPLE 25
Another Formation of HAMO from Glycolic Acid 1 kg of glycolic acid was dissolved into 1.5 L water. 482 g of calcium hydroxide was slowly added to the solution at which to,e the entire slurry solidified. 2.75 L of 4.8 N AGIIS was added in 50-ml intervals. The final volume was 5.0 L. The final pH was 1.0–1.5.

EXAMPLE 26
Effect of HMO from Glycolic Acid and Salicylic Acid on Human SKin The water phase of the HAMO made from Example 23 was applied to hands of a few people. The solution moistened and softened the skin on contact. Best results were achieved by allowing the solution to dry and then briefly rinsing the hands with water.

EXAMPLE 27
Topical Use of HAMO from Glycolic Acid 200 ml of the HAMO from glycolic acid was placed into a vial. 2 g of salicylic acid was added. The mixture was shaken and filtered. 25 ml additional water was added. The volume was about 150 ml. 1 ml glycerine was added and mixed into solution. The final solution had a purple/red tint to it, The pH was 0.0–0.5. When placed onto the hands, the oily feeling from the previous solution was gone. The solution helped to moisten and soften hands. No corrosive reaction was detected.

EXAMPLE 28
General Method for the Formation of an Amino Acid HAMO Using 1.2 M Sulfuric Acid as Regenerating Acid A solution of dilute sulfuric acid approximately 1.2 M in sulfuric acid was prepared by weighing 111.64 g of concentrated (96–98%) sulfuric acid and diluting with water to 1000.0 mL.

The amino acid or its hydrochloride salt (0.025–0.1 mole) was weighed into an Erlenmeyer flask and approximately 10 mole equivalents of water was added. Solid calcium hydroxide (7.40 g, 0.10 mol) was added to the flask and the mixture was stirred at room temperature for 30 minutes to ensure complete reaction. The dilute sulfuric acid (84.0 mL, 0.10 moles $H_2SO_4$) was then added to the mixture. The mixture was filtered through a medium-porosity glass frit to give the HAMO. The total acid content of the HAMO was determined by titration against standard tris-(hydroxymethyl) aminomethane ("THAM").

| HAMOs Prepared From Amino Acids by This Method | | |
|---|---|---|
| Amino Acid | Moles of Amino Acid | $[H_3O^+]$ in HAMO* |
| L-glutamine | 0.10 | 0.133 M[1] |
| L-phenylalanine | 0.05 | 0.185 M[2] |
| L-asparagine | 0.10 | 0.070 M[3] |
| L-histidine.HCl | 0.10 | 0.57 M |
| L-glutamic acid | 0.10 | 0.124 M[4] |
| L-aspartic acid | 0.10 | 0.170 M[5] |
| L-lysine.HCl | 0.10 | 0.56 M[6] |
| L-leucine | 0.10 | 0.173 M[7] |
| L-alanine | 0.10 | 0.099 M[8] |
| L-isoleucine | 0.02 | 0.351 M[9] |
| L-serine | 0.025 | 0.274 M |

*Molarity

1. Ca, 844 ppm; $SO_4$, 3,120 ppm.
2. Ca, 390 ppm; $SO_4$, 13,900 ppm.
3. Ca, 625 ppm; $SO_4$, 3,120 ppm.
4. Ca, 646 ppm; $SO_4$, 5,120 ppm.
5. Ca, 1,290 ppm; $SO_4$, 3,850 ppm.
6. Ca, 1,910 ppm; $SO_4$, 7,560 ppm.
7. Ca, 329 ppm; $SO_4$, 315,000 ppm.
8. Ca, 1,230 ppm; $SO_4$, 4,480 ppm.
9. Ca, 749 ppm; $SO_4$, 314,000 ppm.

| HAMOs Prepared with Amino Acids and Metal Bases* | | |
|---|---|---|
| Amino Acid | Metal Base | Regenerating Acid |
| L-glutamine | $Ca(OH)_2$ | $H_2SO_4$ |
| L-phenylalanine | $Ca(OH)_2$ | $H_2SO_4$ |
| L-asparagine | $Ca(OH)_2$ | $H_2SO_4$ |
| L-histidine.HCl | $Ca(OH)_2$ | $H_2SO_4$ |
| L-glutamic acid | $Ca(OH)_2$ | $H_2SO_4$ |
| L-aspartic acid | $Ca(OH)_2$ | $H_2SO_4$ |
| L-lysine.HCl | $Ca(OH)_2$ | $H_2SO_4$ |
| L-leucine | $Ca(OH)_2$ | $H_2SO_4$ |
| L-alanine | $Ca(OH)_2$ | $H_2SO_4$ |
| L-isoleucine | $Ca(OH)_2$ | $H_2SO_4$ |
| L-serine | $Ca(OH)_2$ | $H_2SO_4$ |
| glycine | $Ca(OH)_2$ | $H_2SO_4$ |
| L-glutamic acid | $CuCO_3.Cu(OH)_2$ | $H_3PO_4$ |
| L-glutamic acid | $2CoCO_3.3Co(OH)_2$ | $H_3PO_4$ |
| L-glutamic acid | $MnCO_3$ | $H_3PO_4$ |

*Each of the product has a pH of lower than about 3.

EXAMPLE 29
Using HAMO to Decontaminate Apples

Each apple in this experiment was immersed in an *E. coli* O157:H7 culture containing $8.8 \times 10^8$ Colony Forming Unit ("CFU")/ml for 5 minutes, and then air-dried at room temperature for about 24 hours. In one group, a volume of 300 ml of HAMO (prepared from acetic acid using phosphoric acid as the regenerating acid. The pH of the HAMO was 1.13) was used to decontaminate *E. coli* O157:H7-contaminated apples for 1 minute with shaking. In another group, the control group, each of the contaminated-apple was treated with 300 ml of sterilized saline. After treatment, each apple was homogenized. A comparison of plate-counts between treated and control group was made. The saline treated apple had $5.37 \times 10^5$ CFU/g ($5.32 \times 10^7$ CFU/apple) survival of *E. coli* O157:H7; while the HAMO treated apple had $4.4 \times 10^1$ CFU/ml ($4.39 \times 10^3$ CFU/apple) survival of *E. coli* O157:H7. Each of the treated and untreated apple weighed about 99 g.

EXAMPLE 30

Using HAMO to Prolong the Shelf-Life of Sausages

Half a pack of non-preserved sausages was dipped in HAMO (prepared from propionic acid using AGIIS as the regenerating acid. The pH of the HAMO was 1.51) for about 0.5 minute, and then packed into a zip-lock bag. The bag was then left at room temperature for 72 hours. In parallel, the other half pack of the sausage was dipped in the same amount of autoclaved de-ionized water. After 72 hours at room temperature, the control group of sausage was rotten; while the HAMO treated group was still fresh. The HAMO treated sausages had over 9-logs reductions in total bacterial counts compared with the control group (i.e. from $9.55 \times 10^9$ CFU/sausage for the control to an amount that was undetectable in the treated sausage).

EXAMPLE 31

"Sanitizing" Chopping Board with HAMO

Two small chopping board were inoculated with 5 ml of *E. coli* O157:H7 culture ($3.55 \times 10^8$ CFU/ml). The board were then air-dried overnight. One board was then soaked for 5 minutes with 10 ml of HAMO (prepared from acetic acid using phosphoric acid as the regenerating acid. pH of the HAMO was 1.13). The board was then wiped 3 times with sterile gauze, each gauze was then soaked in 20 ml of saline solution in a stomacher bag and the bag was stomached at high speed for 2 minutes. Then the serial dilution was performed to determine the bacterial survival. A parallel control was performed using 10 ml of de-ionized water to treat the chopping board. The result shows the water treated chopping board had a survival *E. coli* O157:H7 level of $3.96 \times 10^5$ CFU/board, while the HAMO treated one had no *E. coli* O157:H7 that could be detected.

EXAMPLE 32

Prolonging Shelf-Live of Cheese with HAMO

A block of mild cheddar cheese (about 8 oz) was sprayed with a solution of HAMO (prepared from propionic acid and AGIIS, the pH value of the HAMO was 1.51). The treated cheese was then stored in a zip lock bag and kept at 4° C. A control block of mild cheddar cheese was stored under identical conditions. After 13 days, mold growth was observed on the control, whereas the treated cheese remained mold free for another 20 days.

In a similar experiment, shredded mozzarella cheese was treated with the same HAMO solution by contacting 1, 2, 3, and 4% (v/w) of HAMO with the cheese. The treated and non-treated cheese were sealed in zip lock bags and kept at 4° C. for observation. The group treated with 1% (v/w) HAMO was mold free for about 20 days; the group treated with 2% (v/w) HAMO was mold free for about 31 days; the group treated with 3% HAMO (v/w) was mold free for about 104 days; and the group treated with 4% HAMO (v/w) was mold free for longer than 140 days.

EXAMPLE 33

Treatment of Chicken Drumsticks with HAMO

Each chicken drumstick was inoculated 5 hr prior to treatment with $3.13 \times 10^8$ CFU Salmonella, 100 µl of fresh Salmonella culture was applied to the surface of the drumsticks and allowed to air dry at room temperature. For treatment purposes inoculated drumsticks were immersed in 100 ml of sterilized saline or in 100 ml of HAMO (pH 1.82), which was produced by mixing calcium acetate with phosphoric acid to a pH of ~1.15 and adding calcium lactate buffer 50% (v/v). For salmonella detection each drumstick was placed in a bag with sterile saline and shaken 100 times. An aliquot from each leg wash was then plated. A comparison of plate-counts between treated and control group showed that the number of bacteria per chicken leg was reduced from $2.3 \times 10^6$ CFU/drumstick in control to undetectable levels in treated group.

EXAMPLE 34

Mold Prevention in Cherry Tomatoes by HAMO

A solution of HAMO (from propionic Acid and sulfuric acid pH 1.51) was sprayed on moldy cherry tomatoes and non-moldy cherry tomatoes. The samples were set on the bench at room temperature. At four days post-treatment, the moldy cherry tomatoes and treated with the HAMO exhibited no mold. The non-moldy cherry tomatoes that were not treated started to mold after 2 days incubation at room temperature, whereas the treated cherries tomatoes exhibited no mold for a week.

EXAMPLE 35

HAMO in Canned Pudding 4.8 ml of HAMO from gluconic acid having 437279.15 ppm gluconate (149923.34 ppm/g) was mixed into 14 oz Hunt's Vanilla pudding. The final pH of the pudding is 4.6. The treated pudding looked thicker and no noticeable taste change was found.

While presently preferred embodiments of the invention have been described for purposes of this disclosure, numerous changes may be made which will readily suggest themselves to those skilled in the art and which are accomplished and as defined in the appended claims.

What is claimed is:

1. A method for manufacturing a prepared nutriment comprising:

contacting a solution or suspension of a highly acidic metalated organic acid ("HAMO") with a carrier to give a constituted carrier; and blending the constituted carrier with a nutriment material.

2. The prepared nutriment of claim 1, wherein the nutriment material is food, drink, food supplement, drink supplement, food dressing, seasoning, spices, flavoring agent, or stuffing.

3. A method for reducing biological contaminants in a nutriment comprising:

contacting the nutriment with a solution or suspension of a highly acidic metalated organic acid ("HAMO").

* * * * *